United States Patent
Turner, Jr.

(10) Patent No.: US 10,053,129 B1
(45) Date of Patent: Aug. 21, 2018

(54) ADJUSTABLE ALL-TERRAIN DOLLY SYSTEM AND METHOD

(71) Applicant: Eddie Lee Turner, Jr., Sevierville, TN (US)

(72) Inventor: Eddie Lee Turner, Jr., Sevierville, TN (US)

(73) Assignee: Eddie Lee Turner, Jr., Sevierville, TN (US)

( * ) Notice: Subject to any disclaimer, the term of this patent is extended or adjusted under 35 U.S.C. 154(b) by 0 days.

(21) Appl. No.: 15/426,989

(22) Filed: Feb. 7, 2017

(51) Int. Cl.
*B62B 5/00* (2006.01)
*B62B 3/00* (2006.01)

(52) U.S. Cl.
CPC ............ *B62B 5/0083* (2013.01); *B62B 3/002* (2013.01); *B62B 2205/30* (2013.01); *B62B 2206/02* (2013.01); *B62B 2301/254* (2013.01)

(58) Field of Classification Search
CPC ... B62B 5/0083; B62B 5/0086; B62B 5/0093; B62B 3/002; B62B 3/007; B62B 2205/30; B62B 2206/02; B62B 2301/254
See application file for complete search history.

(56) References Cited

U.S. PATENT DOCUMENTS

| | | | | |
|---|---|---|---|---|
| 1,300,533 A * | 4/1919 | Wessinger | ............. | A47C 17/80 108/93 |
| 2,763,491 A * | 9/1956 | Shafer, Jr. | ............. | B62B 5/0083 220/628 |
| 2,788,220 A * | 4/1957 | Christensen | .......... | B62B 5/0083 280/47.16 |
| 3,215,382 A * | 11/1965 | Stein | ....................... | A47D 11/02 248/172 |
| 3,331,613 A * | 7/1967 | Popelka | ................ | B62B 5/0083 280/35 |
| 3,522,951 A * | 8/1970 | Tyson | ..................... | A63C 5/035 280/842 |
| 3,775,783 A * | 12/1973 | Miller | ..................... | A47C 19/04 5/185 |
| 4,166,638 A * | 9/1979 | De Prado | .............. | B62B 5/0083 280/638 |
| 4,178,006 A * | 12/1979 | Johnson | ................... | B60B 33/00 280/79.11 |
| D286,255 S * | 10/1986 | Gage | .............................. | D7/332 |
| 4,801,152 A * | 1/1989 | Elliott | ..................... | B60B 33/00 114/344 |
| 5,018,930 A * | 5/1991 | Hardin | .................. | B62B 5/0083 254/8 R |
| 5,249,823 A * | 10/1993 | McCoy | ..................... | B62B 3/02 280/144 |
| 5,299,817 A * | 4/1994 | Chang | .................... | B62B 5/0083 280/35 |
| 5,486,014 A * | 1/1996 | Hough | ................... | B62B 5/0083 24/535 |
| 5,599,031 A * | 2/1997 | Hodges | ................. | B62B 5/0083 280/35 |

(Continued)

*Primary Examiner* — Jacob B Meyer

(57) ABSTRACT

An adjustable all-terrain dolly system having a chassis assembly that includes a frame which has a right-side rail, a left-side rail, a first-adjustable cross member and a second-adjustable cross member, and a first-rolling assembly to include a first-set of inline wheels and second-rolling assembly to include a second-set of inline wheels and at least one adjustable-locking mechanism. The adjustable all-terrain dolly system is configured to transport a load over a surface.

17 Claims, 5 Drawing Sheets

(56) References Cited

U.S. PATENT DOCUMENTS

| | | | | |
|---|---|---|---|---|
| 5,707,068 A * | 1/1998 | Bradfield | ............... | A63C 17/01 |
| | | | | 280/11.28 |
| 5,779,252 A * | 7/1998 | Bolton, Jr. | ............... | B62B 3/02 |
| | | | | 280/35 |
| 5,855,385 A * | 1/1999 | Hambsch | ............. | A63C 17/004 |
| | | | | 280/842 |
| 5,863,053 A * | 1/1999 | Berry | ....................... | B25H 5/00 |
| | | | | 280/32.6 |
| 5,938,217 A * | 8/1999 | Wintz | .................... | B62B 3/008 |
| | | | | 280/35 |
| D415,868 S * | 10/1999 | Hewitt | ........................... | D34/23 |
| 6,095,533 A * | 8/2000 | Balolia | .................... | B60T 1/14 |
| | | | | 188/19 |
| 6,109,625 A * | 8/2000 | Hewitt | ............... | B60B 33/0007 |
| | | | | 280/43.24 |
| 6,203,031 B1 * | 3/2001 | Leverington | ......... | B62B 5/0083 |
| | | | | 280/35 |
| 6,371,496 B1 * | 4/2002 | Balolia | .................... | B60T 1/14 |
| | | | | 188/19 |
| 6,371,497 B1 * | 4/2002 | Scire | .................... | B62B 5/0083 |
| | | | | 280/42 |
| 6,783,147 B1 * | 8/2004 | Green, Sr. | ................. | B62B 1/20 |
| | | | | 280/47.26 |
| 6,824,150 B2 * | 11/2004 | Simione | .................... | A62C 3/00 |
| | | | | 280/47.34 |
| 7,036,833 B1 | 5/2006 | Berna | | |
| 7,213,820 B2 * | 5/2007 | Drummond | ......... | B60B 33/0005 |
| | | | | 280/47.34 |
| 7,300,063 B1 * | 11/2007 | Prizmich | ............... | B62B 5/0083 |
| | | | | 280/47.15 |
| D594,622 S * | 6/2009 | Kissun | ........................... | D34/23 |
| 7,762,198 B2 * | 7/2010 | Rasmusson | ........ | B65D 19/0095 |
| | | | | 108/54.1 |
| 7,854,435 B2 * | 12/2010 | Campbell | ............... | B62B 3/008 |
| | | | | 180/65.1 |
| 8,002,510 B2 * | 8/2011 | Williams | ................ | B62B 1/268 |
| | | | | 24/494 |
| 8,025,299 B2 * | 9/2011 | Hiltz | ........................ | B25H 5/00 |
| | | | | 280/32.6 |
| 8,850,656 B2 * | 10/2014 | Bernal | .................. | B62B 5/0093 |
| | | | | 16/24 |
| 8,876,145 B1 * | 11/2014 | Bernal | ...................... | B62B 3/02 |
| | | | | 280/638 |
| 9,010,798 B2 * | 4/2015 | Buttazzoni | ................ | B62B 3/00 |
| | | | | 280/35 |
| 9,027,942 B2 * | 5/2015 | Hasegawa | ............. | B62B 5/0086 |
| | | | | 280/79.11 |
| 9,364,093 B2 * | 6/2016 | Williams | ............. | A47B 91/005 |
| 9,409,585 B2 * | 8/2016 | Buttazzoni | ................ | B62B 3/02 |
| 9,522,763 B2 * | 12/2016 | Roman | ............. | B65D 21/0233 |
| 2003/0098552 A1 * | 5/2003 | Hsiao | ...................... | B62B 1/002 |
| | | | | 280/5.24 |
| 2004/0227316 A1 * | 11/2004 | Drummond | ......... | B60B 33/0005 |
| | | | | 280/79.11 |
| 2007/0210545 A1 * | 9/2007 | Klotz | ...................... | B62B 3/002 |
| | | | | 280/47.35 |
| 2012/0126085 A1 * | 5/2012 | Johnson | ................. | A47C 7/002 |
| | | | | 248/346.03 |
| 2013/0154216 A1 * | 6/2013 | Paulk, Sr. | ............... | B62B 3/002 |
| | | | | 280/79.11 |
| 2013/0187352 A1 * | 7/2013 | Hassell | ................. | B62B 5/0093 |
| | | | | 280/79.11 |
| 2014/0021691 A1 * | 1/2014 | Buttazzoni | ................ | B62B 3/00 |
| | | | | 280/79.11 |
| 2014/0103615 A1 * | 4/2014 | Tsai | ........................ | B62B 3/02 |
| | | | | 280/35 |
| 2014/0210188 A1 * | 7/2014 | Buttazzoni | ............ | B62B 5/0093 |
| | | | | 280/651 |
| 2014/0300070 A1 * | 10/2014 | Veronie | ..................... | B62B 3/10 |
| | | | | 280/79.2 |
| 2017/0151973 A1 * | 6/2017 | Buttazzoni | ................ | B62B 3/02 |
| 2017/0217466 A1 * | 8/2017 | Buttazzoni | ................ | B62B 3/02 |

* cited by examiner

ADJUSTABLE ALL-TERRAIN DOLLY SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of platform dolly and more specifically relates to an adjustable platform dolly over all-terrain.

2. Description of Related Art

Most adjustable platform dollies cannot handle rough terrain efficiently. Most platform dollies do not expand to handle different sized loads and are not multi-functional. Additionally, dollies do not keep direction and are apt to go in any direction. Furthermore, dollies are difficult to load and often the load will fall off. A suitable solution is desired.

U.S. Pat. No. 4,166,638 to Alfred De Prado relates to an adjustable dolly. The described adjustable dolly includes a wheeled platform base of adjustable length, fitted with straps for securing a load to the base, with projecting handles mounted to an end wall of the base and with shoulder padding fixed under the base end to enable a household mover to life and support an end of the carriage on his shoulder for the moving of items of furniture placed on the base.

U.S. Pat. No. 5,599,031 to Douglas Hodges relates to a work dolly having adjustable height, width and length. The work dolly having adjustable height, width and length includes a dolly for movably supporting a load having an adjustable frame with side members and end members. Each side member and end member consists of slidable sections in telescoping relationship for adjusting length and width of the frame. A wheeled support is carried on the underside of the frame for transport purposes.

BRIEF SUMMARY OF THE INVENTION

In view of the foregoing disadvantages inherent in the known platform dolly art, the present disclosure provides a novel adjustable all-terrain dolly system. The general purpose of the present disclosure, which will be described subsequently in greater detail, is to provide an adjustable all-terrain dolly system.

An adjustable all-terrain dolly system is disclosed herein, in a preferred embodiment, comprising: a chassis assembly that includes a frame which has a right-side rail, a left-side rail, a first-adjustable cross member and a second-adjustable cross member, and a first-rolling assembly to include a first-set of inline wheels and second-rolling assembly to include a second-set of inline wheels and at least one adjustable-locking mechanism.

The chassis assembly may comprise in functional combination: the frame, the first-rolling assembly, the second-rolling assembly, and at least one adjustable-locking mechanism. The frame is structurally defined by a right-side rail, a left-side rail, a first-adjustable cross member, and a second-adjustable cross member. The frame may comprise a platform.

The right-side rail is perpendicular to first-adjustable cross member and left-side rail is perpendicular to second-adjustable cross member. The first-rolling assembly is structurally connected to the right-side rail and the second-rolling assembly is structurally connected to the right-side rail, respectively. The right-side rail is parallel to the left-side rail and the first-adjustable cross member is parallel to the second-adjustable cross member. At least one adjustable-locking mechanism is joined to a first-proximal end of said first-adjustable cross member. At least one adjustable-locking mechanism is joined to a second-proximal end of said second-adjustable cross member. The adjustable all-terrain dolly system is configured to transport a load over a surface.

The first-rolling assembly and the second-rolling assembly are linearly aligned and modular. The first-rolling assembly and said second-rolling assembly each may comprise at least two wheels in linear orientation. The at least two wheels in linear orientation are coupled to at least one track. At least one track each may comprise a wheel-skirt. In a preferred embodiment, first-rolling assembly and said second-rolling assembly each may comprise exactly four wheels in a linear orientation (on each side). The four wheels in linear orientation maintain a common plane during use relative to each other.

The first-adjustable cross member and second-adjustable cross member are telescopically extendable and retractable. The right-side rail is adjustable to the left-side rail to a maximum of forty two inches via moving the first-adjustable cross member and the second-adjustable cross member in relation to each other.

At least one adjustable-locking mechanism may comprise a rotatable fastener. The rotatable fastener may comprise at least one wing by which to manipulate the rotatable fastener in relation to the first-adjustable cross member and the second-adjustable cross member. The adjustable all-terrain dolly system is configured to transport a load over a surface. The adjustable all-terrain dolly system is arranged as a kit.

The present invention holds significant improvements and serves as an adjustable all-terrain dolly system. Preferably, an adjustable all-terrain dolly system should provide efficient means for transporting items over difficult terrains and, yet would operate reliably and be manufactured at a modest expense. Thus, a need exists for a reliable adjustable all-terrain dolly to avoid the above-mentioned problems.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an adjustable all-terrain dolly system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a platform dolly and more particularly to an adjustable all-terrain dolly as used to improve the transportation of different loads over a variety of terrains.

Generally speaking, in preferred embodiments, the adjustable all-terrain dolly system is an expandable dolly that has inline wheels on both sides. The adjustable all-terrain dolly system cradles the load allowing the user to set the width of the load, tilt the load and set the load onto the dolly system. This allows the user to easily transport a variety of items like a washing machine, dishwasher or the like. Additionally, a user could add an attachment to the adjustable all-terrain dolly system like a cart in order to haul loose items.

Figure 1:
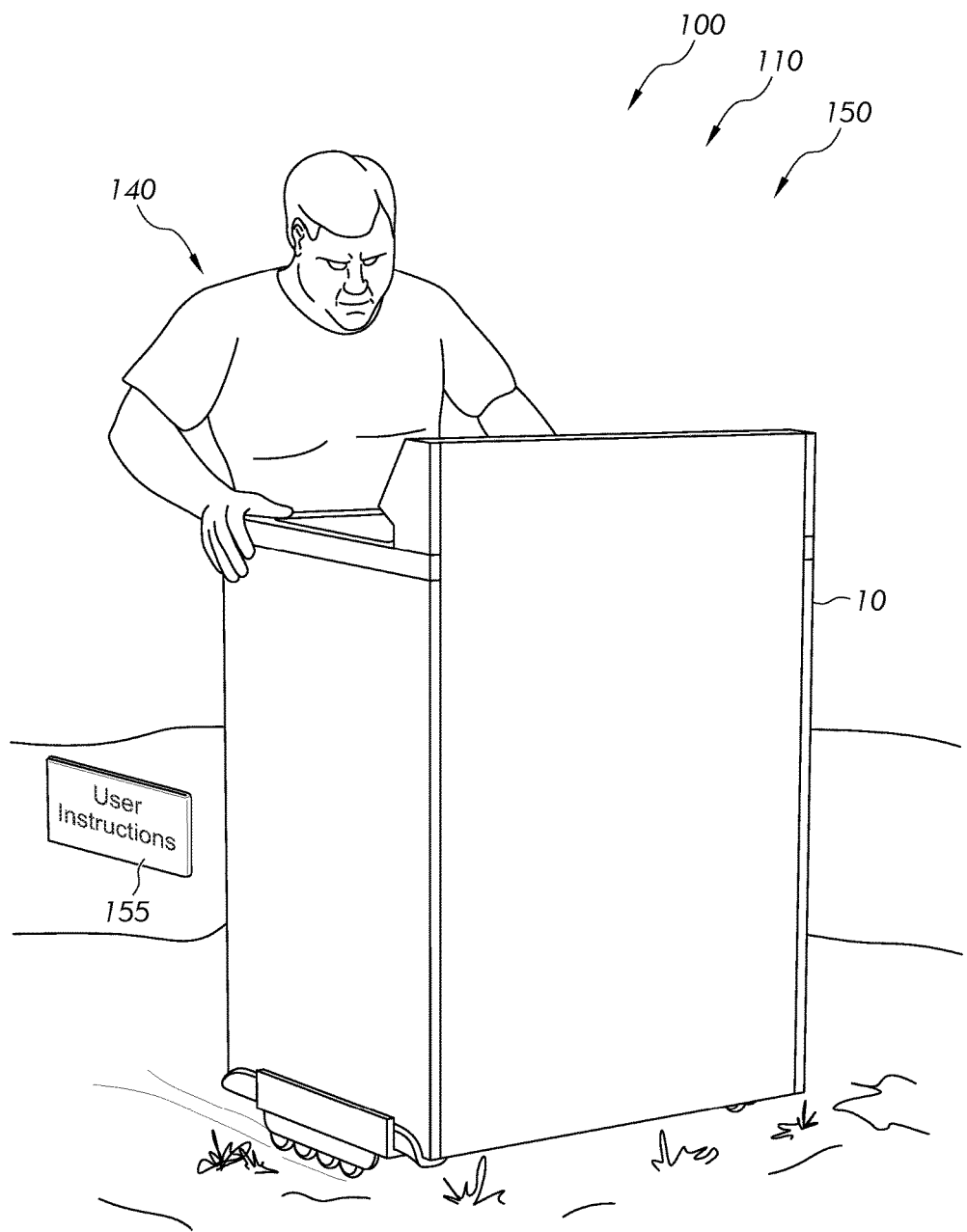
FIG. 1 shows a perspective view of an adjustable all-terrain dolly system during an 'in-use' condition, according to an embodiment of the disclosure.

Referring now more specifically to the drawings by numerals of reference, there is shown in FIGS. 1-4, various views of an adjustable all-terrain dolly system 100. FIG. 1 shows an adjustable all-terrain dolly system 100 during an 'in-use' condition 150, according to an embodiment of the present disclosure. Here, the adjustable all-terrain dolly system 100 may be beneficial for use by a user 140 to transport heavy items over a terrain. As illustrated, the adjustable all-terrain dolly 100 may include: a chassis assembly 110 that includes a frame 120 which has a right-side rail 122, a left-side rail 124, a first-adjustable cross member 126 and a second-adjustable cross member 128, and a first-rolling assembly 160 to include a first-set of inline wheels 164 and second-rolling assembly 170 to include a second-set of inline wheels 174 and at least one adjustable-locking mechanism 180.

According to one embodiment, the adjustable all-terrain dolly system 100 may be arranged as a kit 105. In particular, the adjustable all-terrain dolly system 100 may further include a set of instructions 155. The instructions 155 may detail functional relationships in relation to the structure of the adjustable all-terrain dolly system 100 (such that the adjustable all-terrain dolly system 100 can be used, maintained, or the like, in a preferred manner).

Figure 2:
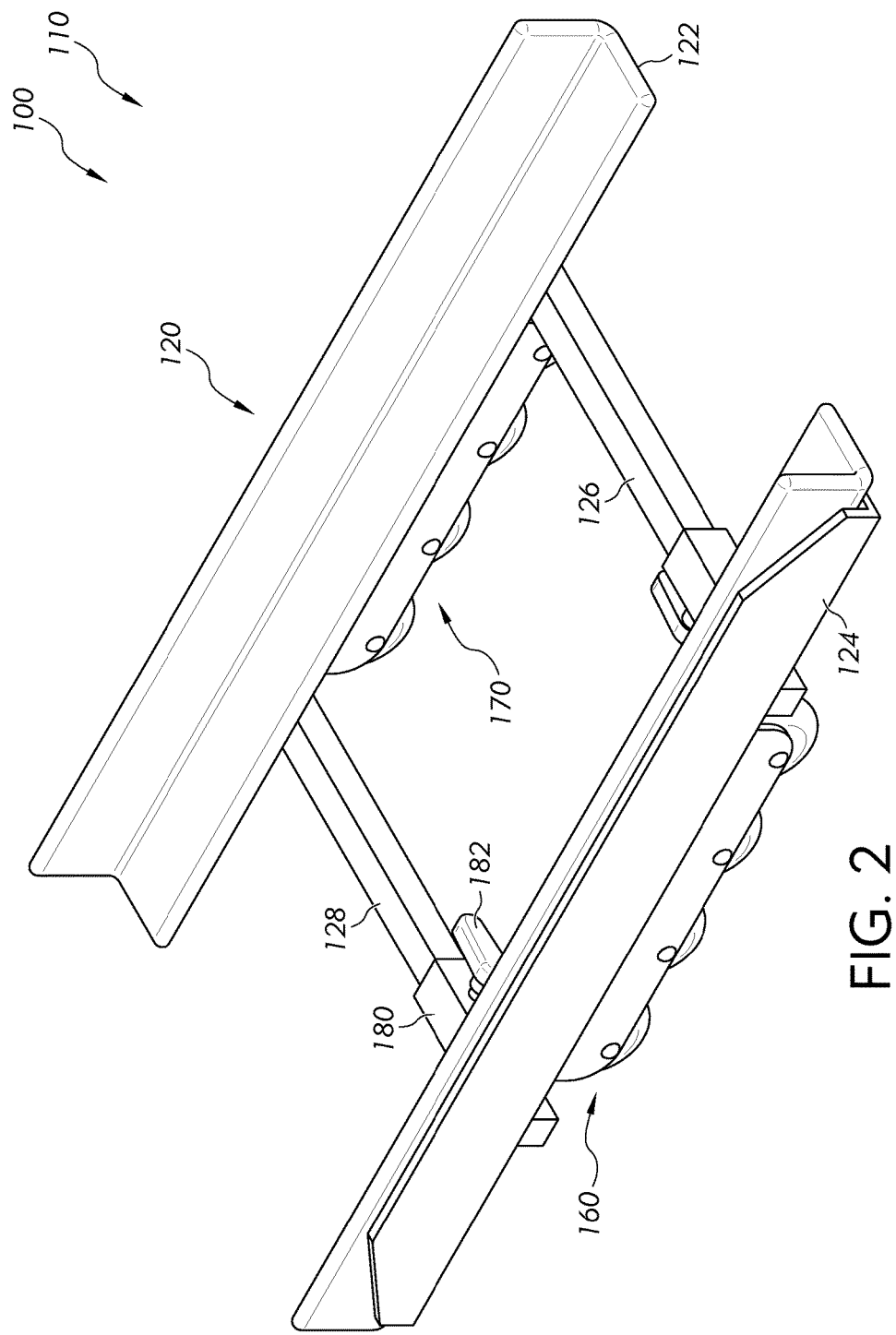
FIG. 2 is a top perspective view of the adjustable all-terrain dolly system of FIG. 1, comprising a chassis assembly according to an embodiment of the present disclosure.

FIG. 2 shows a top perspective view of the adjustable all-terrain dolly system 100 of FIG. 1, according to an embodiment of the present disclosure. As above, the adjustable all-terrain dolly system 100 may include a chassis assembly 110 that includes a frame 120 which has a right-side rail 122, a left-side rail 124, a first-adjustable cross member 126 and a second-adjustable cross member 128, and a first-rolling assembly 160 to include a first-set of inline wheels 164 and second-rolling assembly 170 to include a second-set of inline wheels 174 and at least one adjustable-locking mechanism 180.

The right-side rail 122 is perpendicular to first-adjustable cross member 126 and left-side rail 124 is perpendicular to second-adjustable cross member 128. The first-rolling assembly 160 is structurally connected to the right-side rail 122 and the second-rolling assembly 170 is structurally connected to the right-side rail 122, respectively. The right-side rail 122 is parallel to the left-side rail 124 and the first-adjustable cross member 126 is parallel to the second-adjustable cross member 128. At least one adjustable-locking mechanism 180 is joined to a first-proximal end of the first-adjustable cross member 126. At least one adjustable-locking mechanism is joined to a second-proximal end of the second-adjustable cross member 128. The adjustable all-terrain dolly system 100 is configured to transport a load 10 over a surface.

The first-rolling assembly 160 and the second-rolling assembly 170 are linearly aligned and modular. The first-rolling assembly 160 and the second-rolling assembly 170 each comprise at least two wheels in linear orientation. The at least two wheels in linear orientation are coupled to at least one track 162. At least one track 162 each comprises a wheel-skirt 163. In a preferred embodiment, first-rolling assembly 160 and the second-rolling assembly 170 each comprises exactly four wheels in a linear orientation. The four wheels in linear orientation maintain a common plane during use relative to each other.

Figure 3:
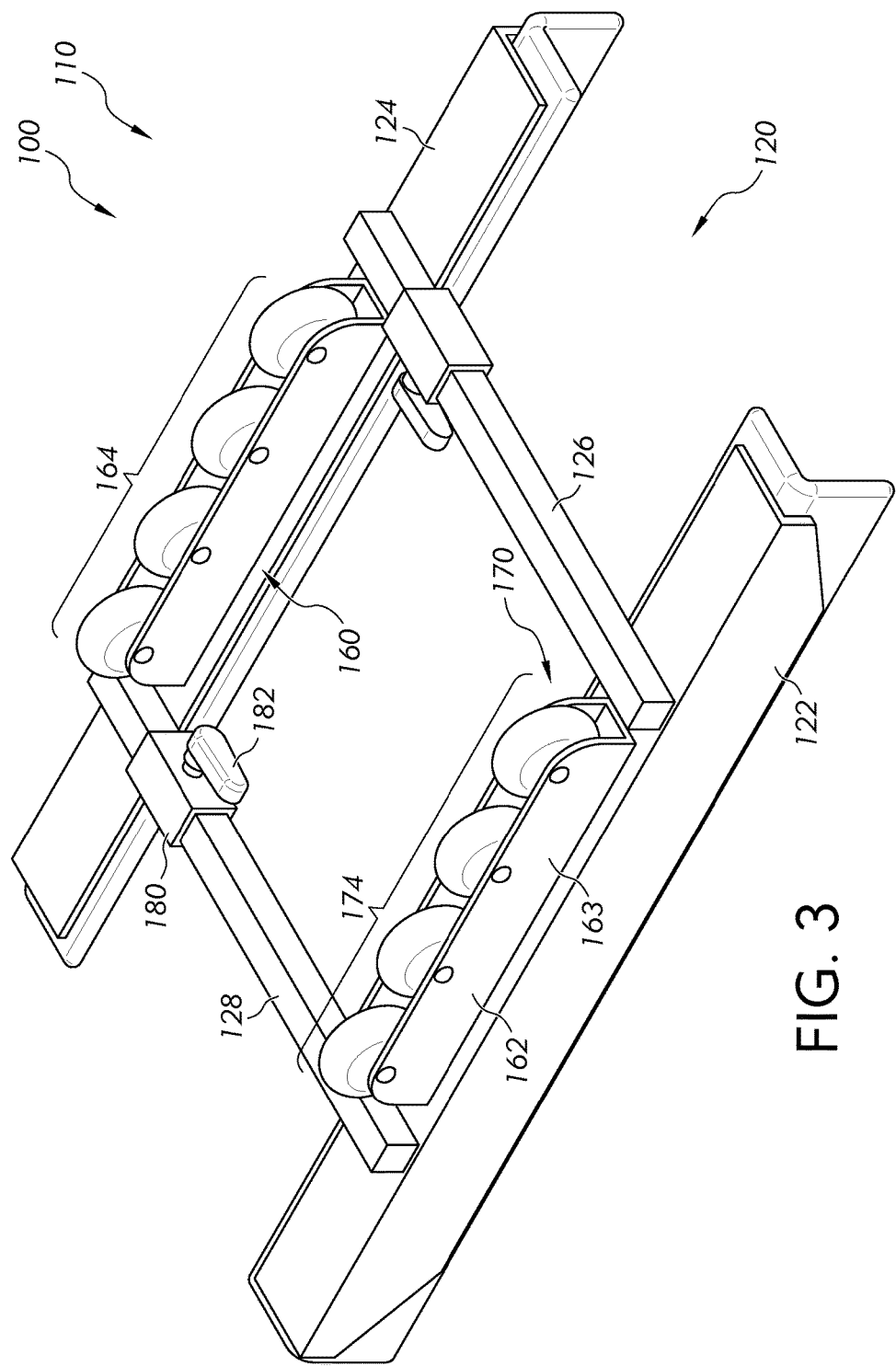
FIG. 3 is a bottom perspective view of the chassis assembly of FIG. 1, according to an embodiment of the present disclosure.

FIG. 3 is a bottom perspective view of the chassis assembly 110 of FIG. 1, according to an embodiment of the present disclosure. The first-adjustable cross member 126 and second-adjustable cross member 128 are telescopically extendable and retractable. The right-side rail 122 is adjustable to the left-side rail 124 to a maximum of forty-two inches via moving the first-adjustable cross member 126 and the second-adjustable cross member 128 in relation to each other.

Figure 4:
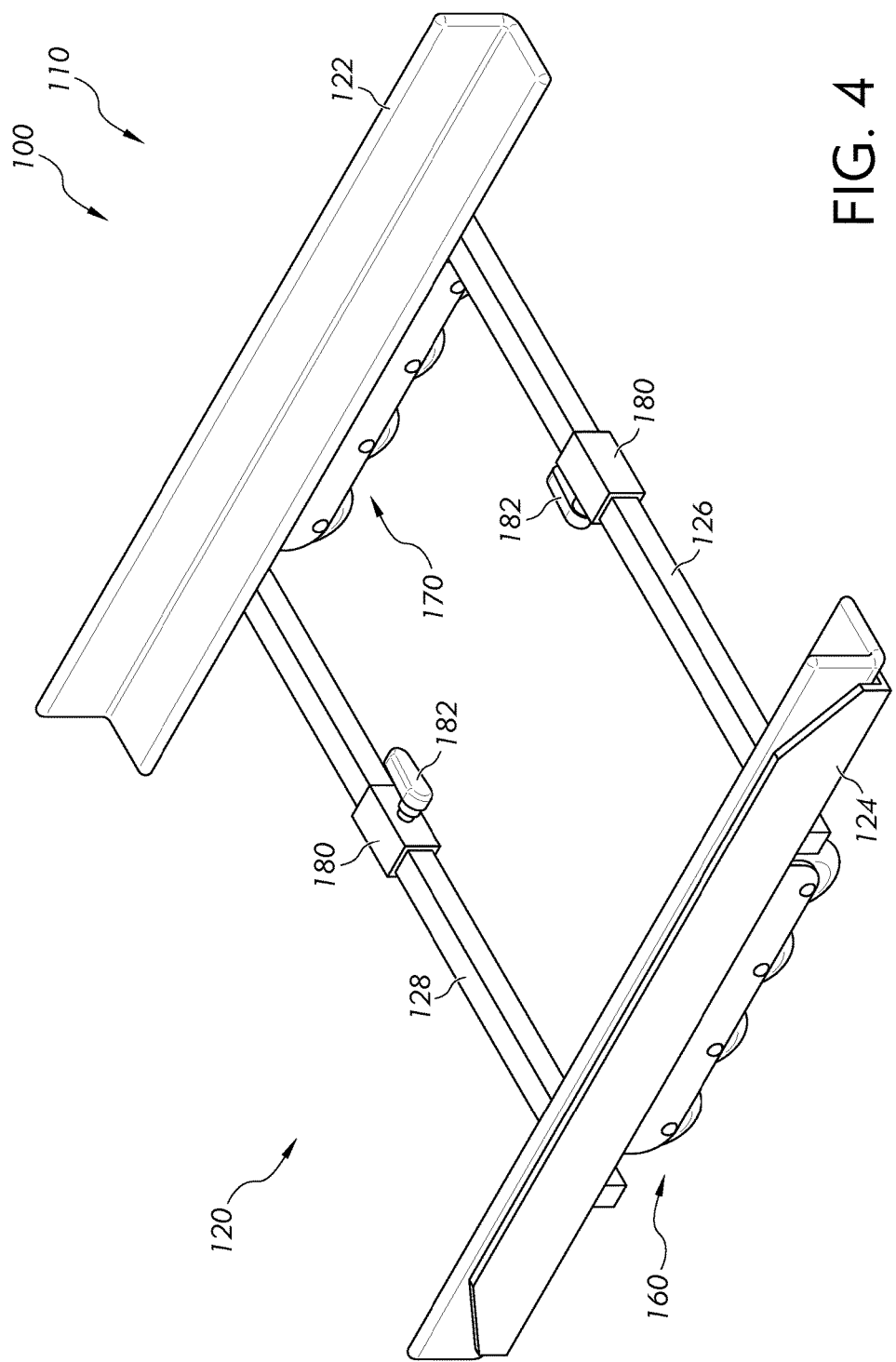
FIG. 4 is a top perspective view of the chassis assembly of FIG. 1 in an expanded form, according to an embodiment of the present disclosure.

FIG. 4 is a top perspective view of the chassis assembly 110 of FIG. 1, according to an embodiment of the present disclosure. The chassis assembly 110 comprises in functional combination the frame 120, the first-rolling assembly 160, the second-rolling assembly 170, and at least one adjustable-locking mechanism 180. The frame 120 is structurally defined by a right-side rail 122, a left-side rail 124, a first-adjustable cross member 126, and a second-adjustable cross member 128. The frame 120 comprises a platform.

At least one adjustable-locking mechanism 180 comprises a rotatable fastener 182. The rotatable fastener 182 comprises at least one wing by which to manipulate the rotatable fastener 182 in relation to the first-adjustable cross member 126 and the second-adjustable cross member 128. The adjustable all-terrain dolly system 100 is configured to transport a load 10 over a surface. The adjustable all-terrain dolly system 100 is arranged as a kit 105.

Figure 5:
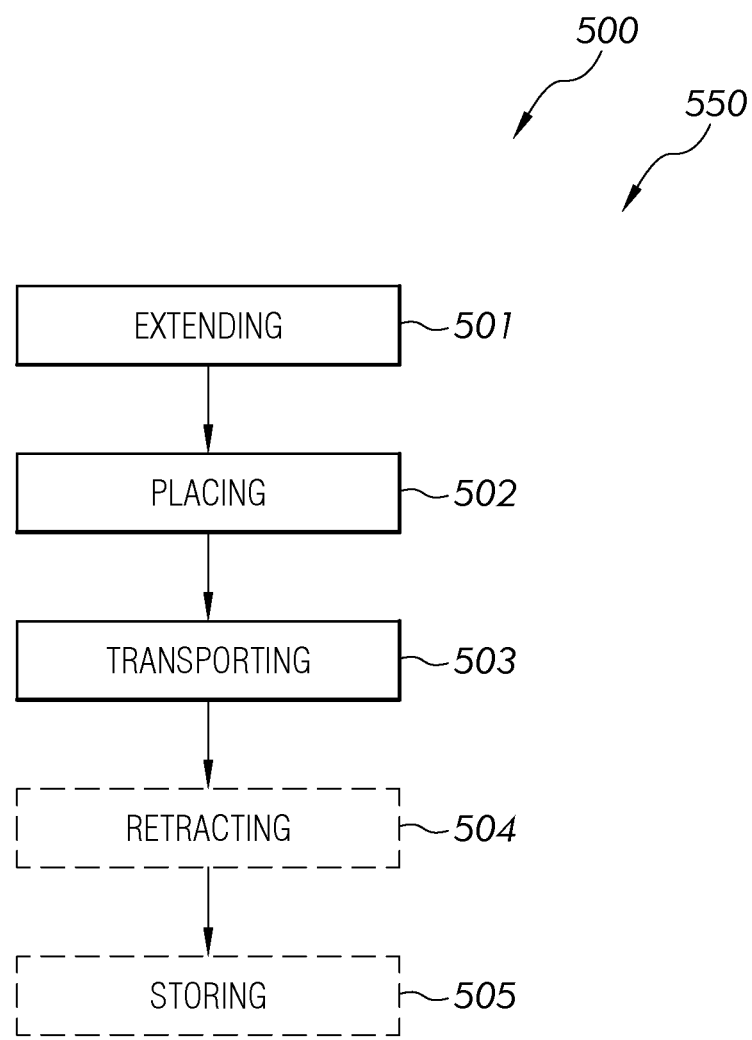
FIG. 5 is a flow diagram illustrating a method of use of the adjustable all-terrain dolly system, according to an embodiment of the present disclosure.

FIG. 5 is a flow diagram illustrating a method for transporting a load 10 over a surface, according to an embodiment of the present disclosure. In particular, the method for transporting a load 10 over a surface 500 may include one or more components or features of the adjustable all-terrain dolly system 100 as described above. As illustrated, the method for transporting a load 10 over a surface 500 may include the steps of: step one 501, extending a first-adjustable cross member 126 and a second-adjustable cross member 128; step two 502, placing at least one item on the adjustable all-terrain dolly system 100; step three 503, transporting the at least one item over a surface; step four 504, retracting the first-adjustable cross member 126 and the second-adjustable cross member 128; step five 505, storing the adjustable all-terrain dolly system 100.

It should be noted that steps four 504 and five 505 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for transporting a load over a surface (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A dolly facilitating the transport of a load across a floor or underlying surface, the dolly comprising:
    a chassis assembly defining an elongated load-supporting platform and including a forward edge and an opposite rearward edge, and the chassis assembly includes a frame including two opposite side rails which extend between the forward edge and the rearward edge of the platform, and the platform has a fore-to-aft length as measured between the forward edge and the rearward edge thereof; and
    two sets of floor-engaging wheels which are joined to the frame and are arranged beneath the load-supporting platform of the chassis assembly, one of the two sets of floor-engaging wheels being disposed adjacent one of the two opposite side rails and a second set of wheels being disposed adjacent the other of the two opposite side rails of the frame, the wheels of each of the two sets of wheels being arranged inline with one another and including a forwardmost wheel, a rearwardmost wheel and least one intermediate wheel disposed between the forwardmost and rearwardmost wheels, and each of the two sets of wheels having a front-to-rear length as measured between the front of the forwardmost wheel and the rear of the rearwardmost wheel, and each of the two sets of wheels is substantially centered between the forward and rearward edges of the platform and the front-to-rear length of each of the two sets of wheels is about one-half of the fore-to-aft length of the platform so that an appreciable portion of the platform extends between the front of the forwardmost wheel of each set of wheels and the forward edge of the platform and an appreciable portion of the platform extends between the rear of the rearwardmost wheel of each set and the rearward edge of the platform; and
    each wheel of the two sets of wheels has a peripheral surface for engaging the floor or underlying surface as the dolly is rolled therealong, and the peripheral surface of each wheel has a transverse cross section which is shaped so that as the dolly is rolled along the floor or underlying surface, the peripheral surface of each wheel engages the floor or underlying surface at a substantially single point to enhance the maneuverability of the dolly as the dolly is rolled across the floor or underlying surface.

2. The dolly as defined in claim 1 wherein the transverse cross section of each wheel as viewed through the point at which the wheel engages the floor or underlying surface is arcuate in shape.

3. The dolly as defined in claim 1 wherein the shape of the transverse cross section of each wheel as viewed through the point at which the wheel engages the floor or underlying surface resembles a U.

4. The dolly as defined in claim 1 wherein each wheel of the two sets of wheels are arranged for rotation about axes which are parallel to one another and include two opposite side faces, and the chassis assembly includes a first elongated skirt within which the wheels of one of the two sets of wheels are rotatably mounted and a second elongated skirt within which the wheels of the other of the two sets of wheels are mounted, and each of the first and second elongated skirts includes one face-covering portion which extends along one of the two side faces of the wheels in the corresponding set of wheels and another face-covering portion which extends the other of the two side faces of the wheels in the corresponding set of wheels.

5. The dolly as defined in claim 1 wherein the number of wheels of each set of wheels is four.

6. The dolly as defined in claim 1 wherein the frame includes cross member assemblies which extend between the two opposite side rails of the frame, and the cross member assemblies accommodate an adjustment in the spaced-apart distance between the two opposite side rails of the frame and the side-to-side width of the load-supporting platform.

7. The dolly as defined in claim 6 wherein the cross member assemblies of the frame include one cross-member which is arranged adjacent the forward edge of the platform and includes two opposite ends which are disposed adjacent the two opposite side rails of the frame, and the cross member assemblies include another cross-member which is arranged adjacent the rear edge of the platform and includes two opposite ends which are disposed adjacent the two opposite side rails of the frame, and each of the one and another cross-members accommodates an adjustment in length between its opposite ends to thereby accommodate an adjustment in the spaced-apart distance between the two opposite side rails of the frame.

8. The dolly as defined in claim 7 wherein each of the one and another cross-members includes a first elongated member which provides one of the two opposite ends of the cross-member and includes a second elongated member which provides the other of the two opposite ends of the cross-member, and the first and second elongated members of each cross-member are releasably securable to one another in alternative lengthwise positional relationships to accommodate an alteration in the spaced distance between the opposite ends of the cross-member.

9. The dolly as defined in claim 8 further including means for releasably locking the first and second elongated members of each cross-member in a fixed positional relationship with respect to one another.

10. A dolly for transporting a load across a floor or underlying support structure, the dolly comprising:
    a chassis assembly providing an elongated load-supporting platform upon which a load is positionable and including a forward edge and an opposite rearward edge, and the chassis assembly includes a frame including two opposite side rails which extend between the forward edge and the rearward edge of the platform, and the platform has a fore-to-aft length as measured between the forward edge and the rearward edge thereof; and
    floor-engaging wheels joined to the frame and are arranged beneath the load-supporting platform of the chassis assembly, the floor-engaging wheels including a first set of inline wheels disposed adjacent one of the two opposite side rails of the frame and a second set of inline wheels disposed adjacent the other of the two opposite side rails of the frame, the wheels of each of the first and second set of wheels including a forwardmost wheel and a rearwardmost wheel and least one intermediate wheel disposed between the forwardmost and rearwardmost wheels, and each of the first and second set of wheels has a front-to-rear length as measured between the front of the forwardmost wheel and the rear of the rearwardmost wheel, and each of the first and second set of wheels is substantially centered between the forward and rearward edges of the platform and the front-to-rear length of each of the first and second sets of wheels is about one-half of the fore-to-aft length of the platform so that an appreciable portion of the platform extends forwardly of the front of the forwardmost wheel to the forward edge of the platform and so that an appreciable portion of the platform extends rearwardly of the rear of the rearwardmost wheel to the rearward edge of the platform; and
    each wheel of the first and second set of wheels has a peripheral surface for engaging the floor or underlying surface as the dolly is rolled therealong, and the peripheral surface of each wheel has a transverse cross sectional shape so that as the dolly is rolled across a floor or underlying surface, each wheel of the first and second set of wheels makes contact with the floor or underlying surface at substantially a single point to enhance the maneuverability of the dolly as the dolly is rolled across the floor or underlying surface.

11. The dolly as defined in claim 10 wherein the transverse cross section of the peripheral surface of each wheel is arcuate in shape.

12. The dolly as defined in claim 10 wherein the transverse cross section of the peripheral surface of each wheel is substantially U-shaped.

13. The dolly as defined in claim 10 wherein each wheel of the two sets of wheels are arranged for rotation about axes which are parallel to one another and include two opposite side faces, and the chassis assembly includes a first elongated skirt within which the wheels of one of the two sets of wheels are rotatably mounted and a second elongated skirt within which the wheels of the other of the two sets of wheels are mounted, and each of the first and second elongated skirts includes one face-covering portion which extends along one of the two side faces of the wheels in the corresponding set of wheels and another face-covering portion which extends the other of the two side faces of the wheels in the corresponding set of wheels.

14. The dolly as defined in claim 10 wherein the number of wheels of each set of wheels is four.

15. The dolly as defined in claim 10 wherein the frame is adjustable in width so that the spaced-apart distance between the two opposite side rails of the frame can be altered to thereby adjust the width of the load-supporting platform of the chassis assembly.

16. The dolly as defined in claim 15 wherein the frame includes at least one cross member assembly which extends between the two opposite side rails of the frame, and the at least one cross member assembly includes elongated members which can be telescopically shifted lengthwise with respect to one another to alter the spaced-apart distance between the two opposite side rails of the frame.

17. The dolly as defined in claim 16 further comprising means for releasably locking the elongated members of the at least one cross member assembly in a fixed lengthwise positional relationship with respect to one another to thereby fix the width of the load-supporting platform of the chassis assembly.

* * * * *